(12) United States Patent
Kempf et al.

(10) Patent No.: US 7,297,178 B2
(45) Date of Patent: Nov. 20, 2007

(54) METHOD AND DEVICE FOR PRODUCING SPHERICAL METAL PARTICLES

(75) Inventors: Bernd Kempf, Kleinwallstadt (DE); Georg Ptaschek, Rosbach (DE); Hans-Martin Ringelstein, Frankfurt am. Main (DE); Roland Fuchs, Geiselbach (DE); Calogero DiVicenzo, Hanau-Mittelbuchen (DE)

(73) Assignee: Umicore AG & Co. KG, Hanau (DE)

( * ) Notice: Subject to any disclaimer, the term of this patent is extended or adjusted under 35 U.S.C. 154(b) by 513 days.

(21) Appl. No.: 10/476,093

(22) PCT Filed: Apr. 26, 2002

(86) PCT No.: PCT/EP02/04652

§ 371 (c)(1),
(2), (4) Date: Apr. 1, 2004

(87) PCT Pub. No.: WO02/087810

PCT Pub. Date: Nov. 7, 2002

(65) Prior Publication Data

US 2004/0154435 A1 Aug. 12, 2004

(30) Foreign Application Priority Data

Apr. 26, 2001 (DE) .............................. 101 20 612

(51) Int. Cl.
B22F 9/08 (2006.01)

(52) U.S. Cl. .......................................... 75/335; 75/340
(58) Field of Classification Search .................. 75/335, 75/340
See application file for complete search history.

(56) References Cited

U.S. PATENT DOCUMENTS

| 3,729,278 | A |   | 4/1973 | Lysher |
| 3,962,385 | A | * | 6/1976 | Niimi et al. ................... 75/337 |
| 5,891,212 | A | * | 4/1999 | Tang et al. .................... 75/335 |
| 6,862,890 | B2 | * | 3/2005 | Williams et al. ............... 62/64 |

FOREIGN PATENT DOCUMENTS

| DE | 40 12 197 A1 | 10/1991 |
| WO | WO 00/51746 | 9/2000 |

OTHER PUBLICATIONS

International Search Report.

* cited by examiner

*Primary Examiner*—George Wyszomierski
(74) *Attorney, Agent, or Firm*—Kalow & Springut LLP

(57) ABSTRACT

The invention relates to a process and a device (1) for the production of spherical metal particles (2) from a melt (3). In order to produce droplets a melt jet (8) is subjected to vibrations and is led through at least one nozzle (7). In order to produce spherical metal particles (2) the droplets at the outlet of the nozzle (7) are fed to a coolant (10) for purposes of consolidation. The nozzle (7) dips into the coolant (10), the temperature of the coolant (10) being below the melting point of the melt (3).

12 Claims, 1 Drawing Sheet

METHOD AND DEVICE FOR PRODUCING SPHERICAL METAL PARTICLES

BACKGROUND OF THE INVENTION

The present invention relates to a process and a device for the production of spherical metal particles.

Such spherical metal particles are formed in particular as soldering beads, which are used for the electrical contacting of electronic components. One typical field of application in this connection is the contacting of integrated circuits on printed circuit boards. Soft soldering alloy beads in particular are used for this purpose, whose diameters are typically in the range between 0.1 and 1.5 mm. A decisive factor for a reproducible and defect-free contacting is that the soldering beads have as ideal a spherical shape as possible. In addition the variation in size of the soldering beads that are used should be as small as possible.

A process and a device for the production of spherical particles from a liquid phase are known from EP 0 467 221 B1. The particles to be produced consist in particular of metal or glass.

Droplets are formed from the liquid phase. For this purpose the liquid phase is fed to a vibrating nozzle.

The nozzle itself as well as a defined section connected to the outlet opening is maintained at a constant temperature that is 1° C. to 10° C. above the melting point of the liquid phase.

The droplets leaving the outlet opening still have a spherical shape. This spherical shape of the droplets is first of all formed during passage along the aforementioned section. The section is arranged vertically so that, due to the force of gravity, the droplets execute a falling movement along the section, during which the spherical shapes of the droplets are produced.

After passing through this section the spherical droplets are led into a gaseous or liquid coolant whose operating temperature is at least 100° C. below the melting point. The feed of the coolant preferably takes place in the same direction as the falling direction of the droplets. Due to the contact with the coolant the droplets are suddenly quenched, resulting in a consolidation of the droplets into the respective particles.

A significant disadvantage of this process is that when the droplets strike the surface of the coolant deformations of the said droplets occur, leading to variations of the particles from the desired spherical shape.

A further disadvantage is that the section between the outlet opening of the nozzle and surface of the coolant cannot or can only be incompletely screened against the ambient atmosphere. In the production of metal particles using oxidizable metal melts a partial, uncontrolled closure of the outlet opening of the nozzle then occurs. This leads in turn to undesirable variations in the size distributions of the metal particles.

DE 40 12 197 C2 describes a process for the production of spherical metal particles from a melt. The melt is introduced dropwise from a melting crucible into a stream of liquid that forms a coolant for cooling the droplets. An oil is preferably used as coolant. The liquid stream is in this connection led countercurrent to the falling direction of the droplets. A temperature gradient is formed within the liquid stream, with the result that the temperature of the liquid in the region of the outlet opening is at least as high as the melting point of the metal. The temperature of the liquid in the region of the liquid feed is thus so low that the droplets falling in the liquid stream solidify at least on their surfaces.

A disadvantage in this respect is that the liquid has to be heated to temperatures that correspond to the melting point of the metal, which leads to a marked thermal stress of the coolant. This in turn leads to an undesirably severe restriction on the availability of such systems, since the coolant has to be renewed within short time intervals. In addition there is the danger of the formation of cracked products in the region of the outlet opening of the nozzle. The flow of the liquid through the nozzle is thereby affected, resulting in undesirably high variations in the sizes of the metal spheres.

SUMMARY OF THE INVENTION

The object of the invention is to provide a process and a device of the type mentioned in the introduction that permits a production of metal particles having as perfect a spherical shape as possible and of constant size.

This object is achieved by the features as claimed herein. Advantageous embodiments and expedient developments are also claimed.

The process according to the invention relates to the production of spherical metal particles from a melt. In order to generate droplets a melt jet is subjected to vibrations and passed through at least one nozzle. The corresponding device according to the invention comprises suitable means for generating the vibrations. In order to produce the spherical metal particles the droplets at the outlet of the nozzle are fed into a coolant for purposes of solidification. In this connection the nozzle dips into the coolant, the temperature of the coolant being below the melting point of the melt.

A significant advantage of the invention is that the nozzle dips into the preferably liquid coolant, with the result that the droplets at the outlet opening are fed directly into the coolant. In this way no cross-sectional diminutions of the outlet opening of the nozzle due to oxidation effects can occur in the outlet opening of the nozzle. The droplets formed on passage through the nozzle thus have a constant and reproducible size. Since the droplets are fed directly after leaving the nozzle into the coolant they are not subjected to any deformations, which would otherwise occur if the droplets impacted on a coolant surface.

A further advantage is that the temperature of the coolant, in particular also in the region of the outlet opening of the nozzle, is significantly below the melting point of the melt.

The thermal stress of the coolant is accordingly correspondingly low. The temperature of the coolant in the region of the outlet opening of the nozzle is typically at least 10° C., but at most 100° C., below the melting point. The coolant temperature is particularly preferably in a range from 20° C. to 70° C. below the melting point.

In an advantageous embodiment of the invention the temperature of the coolant constantly decreases with increasing distance from the outlet opening. As a droplet passes through the coolant it becomes continuously consolidated as the temperatures progressively decrease. In this connection it is essential that the solidification of a droplet does not take place suddenly on leaving the nozzle. This effect is assisted by the fact that, on account of a supercooling of the droplets and the enthalpy of solidification released during their solidification, the consolidation of the droplets to the metal spheres takes place only after a certain delay time.

In this way the droplets during their passage through the coolant are first of all formed into perfect spheres, before they solidify into the spherical metal particles.

It is particularly advantageous in this connection that the preferably liquid coolant does not have to be moved.

By means of the process according to the invention spherical metal particles, in particular soldering beads, can be produced, whose shapes are perfectly spherical and whose sizes are subject to only extremely slight variations. In addition the soldering beads have metallically shiny, smooth surfaces.

Spherical metal particles, in particular soldering beads with sizes of typically 0.1 mm to 1.5 mm diameter, can be produced with the device according to the invention. The soldering beads that are thereby produced can advantageously be used as so-called ball grid arrays for the electrical contacting of integrated circuit boards.

The invention is described in more detail hereinafter with the aid of the drawing, in which:

DETAILED DESCRIPTION OF THE PREFERRED EMBODIMENTS

Figure 1:
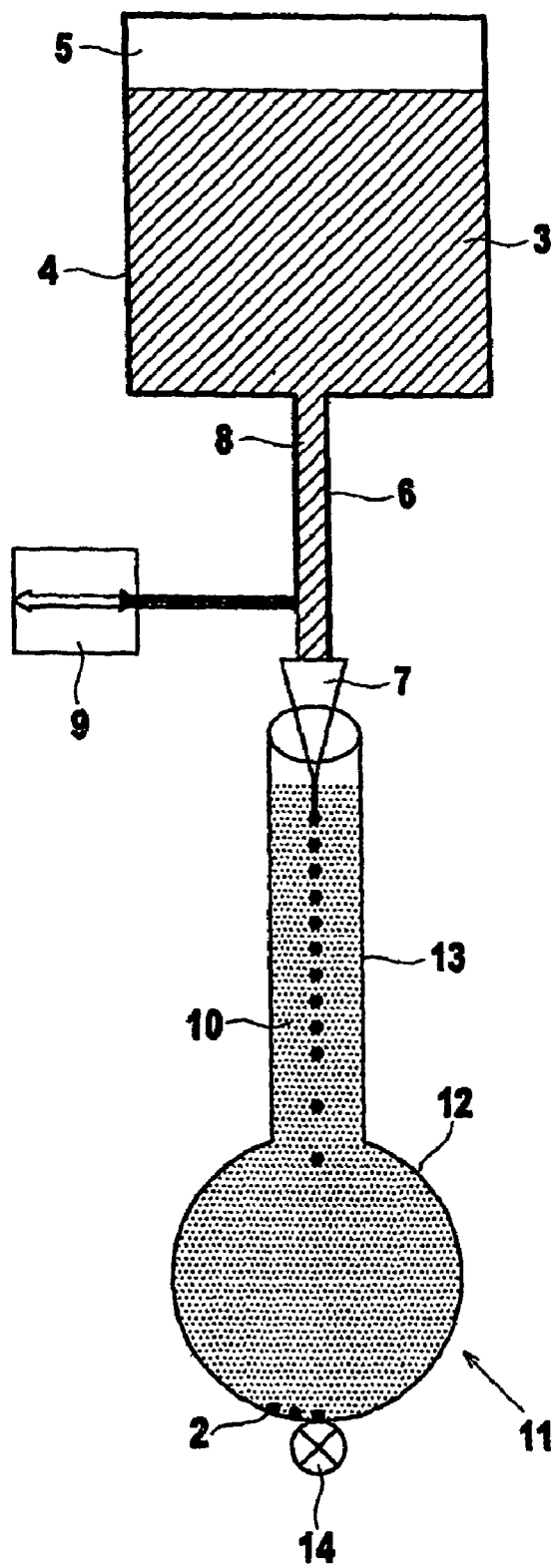
FIG. 1: is a diagrammatic representation of an embodiment of the device according to the invention.

FIG. 1 shows an embodiment of the device 1 according to the invention for the production of spherical metal particles 2 from a melt 3.

The metallic melt 3 is contained in a vessel 4, the interior of which is subjected to a protective gas atmosphere 5 whose pressure can be regulated. The metal forming the melt 3 is heated in the vessel 4 by means of a heating device (not shown) to a temperature above the melting point of the metal. The walls of the vessel 4 are formed in a gas-tight manner.

A tubular melt outflow 6 that leads to a nozzle 7 is provided on the lower side of the vessel 4. A melt jet 8 from the vessel 4 is fed to the nozzle 7 through the melt outflow 6.

In the present embodiment the melt outflow 6 is aligned vertically and terminates at the floor of the vessel 4, so that the melt jet 8 is fed to the nozzle 7 by the force of gravity.

Alternatively the melt outflow 6 can also be directed upwardly relative to the nozzle 7, which means that the melt jet 8 is fed into the nozzle 7 only under the action of pressure. A pressure device, in particular a gas pressure device, may be provided for this purpose. The advantage of this arrangement is that the melt 3 can be fed to the nozzle 7 in a regulated manner via the generated pressure. It is then in particular ensured that no melt 3 exits via the nozzle 7 in the event of a loss of pressure.

In principle a pressure device can also be provided in the device 1 according to FIG. 1, in order to convey the melt 3 under pressure to the nozzle 7.

In the present embodiment an individual nozzle 7 is provided. In principle multiple arrangements of nozzle 7 may also be provided.

The nozzle 7 and the melt outflow 6 are also heated, for which purpose a separate heating element (likewise not shown) is provided.

So that the melt 3 can leave the outlet opening of the nozzle 7 in the form of droplets of defined and constant size, means are provided for generating vibrations in the melt 3. In principle these means may be formed by a vibrating plate that is installed in the melt 3 in the interior of the vessel 4.

In the present case these means are formed by a vibrating element 9 that is coupled to the nozzle 7 directly or via the melt outflow 6, in order to cause the nozzle to execute vibrations. The vibrating element 9 may be formed by a piezoelectric element or an electromagnetic vibrating element 9.

The outlet opening of the nozzle 7 dips into a liquid coolant 10 that is stored in a quiescent manner in a collecting vessel 11. The collecting vessel 11 has a basic body 12 on whose surface terminates a hollow cylindrical column 13. The column 13 running in the vertical direction is open at its upper end, the nozzle 7 projecting through the open upper end into the interior of the column 13.

A further heating device is associated with the collecting vessel 11. The collecting vessel 11 is conveniently heated so that the temperature of the coolant 10 in the column 13 decreases continuously from its upper end to its lower end. In principle a spatially changeable or a constant temperature profile of the coolant 10 in the collecting vessel 11 may also be chosen. In each case it is ensured that the temperature of the coolant 10 at no point in the collecting vessel 11 reaches the melting point of the melt 3.

The droplets leaving the nozzle 7 solidify on passage through the coolant 10 and collect as spherical metal particles 2 on the floor of the collecting vessel 11. A discharge device 14 is located in the region of the floor of the collecting vessel 11, through which the spherical metal particles 2 can be removed from the collecting vessel 11.

In order to obtain a continuously operating production process, means are preferably provided for the continuous feed of the melt 3 to the vessel 4. For example, these means may comprise a refilling vessel or the like.

The whole device 1 is conveniently enclosed in a vacuum-tight manner in order to obtain a defined protective gas atmosphere 5 in its interior.

The melt 3 in the vessel 4 consists of metal or metallic alloys for the production of soldering beads, the melting point of the latter preferably being below 500° C.

The temperature of the melt jet 8 in the region of the melt outflow 6 and in the region of the nozzle 7 is maintained at a constant value above the melting point of the melt 3, the temperature being at least 10° C. above the said melting point.

The temperature of the coolant 10 in the region of the nozzle 7 is however at least 10° C. but at most 100° C. below the melting point of the melt 3. Particularly preferably the temperature of the coolant 10 is in a range 20° C. to 70° C. below the melting point.

The type of coolant 10 that is used depends on the type of melt 3 and in particular on its melting point.

For high melting point metal alloys, for example Pb-based solders with melting points in the region of about 300° C., silicone oils such as for example silicone oil AP 150 are preferably used as coolant 10.

For metal alloys whose melting points are just below 300° C., such as for example Pb-based solders, Sn-based solders or Pb—Sn solders, mineral oils are used for example. Moreover, synthetic coolants may be used, in particular heat transfer liquids such as for example Marlotherm based on benzyltoluene (Hüls company), Quenchant (Houden company) or Mediatherm (Hoechst). Liquid polyethylene glycols or paraffin oils may also be used as coolants.

For metal alloys whose melting points are far below 300° C., such as for example eutectic Sn—Pb solders with additives such as indium and bismuth, biologically degradable oils that are obtained from renewable raw materials may in particular be used. Examples include soya oil, palm oil, castor oil, coconut oil, sunflower oil, rapeseed oil, olive oil, linseed oil as well as nut oils such as for example groundnut oil or pumpkin seed oil.

In order to produce spherical metal particles 2 from the melt 3 stored in the vessel 4, the melt jet 8 in the melt outflow 6 and in particular in the region of the nozzle 7 is caused to vibrate.

According to the principle described by Lord Raleigh (Proc. Lond. Math. Soc. 10, 4 (1878)) constrictions are produced in the melt jet 8 due to the vibrations. Due to these constrictions the originally homogeneous melt jet 8 is split into defined cylindrical sections. With a suitable dimensioning of the cylindrical sections droplets are formed from the latter on leaving the nozzle 7, which have a spherical shape when introduced and fed in the coolant 10.

In order to produce the desired constrictions in the melt jet 8, the wavelength of the induced vibrations must be greater than the diameter of the melt jet 8. It has been found that the optimal wavelength of the vibrations is about 4.5 times the value of the diameter of the melt jet 8.

The optimal diameter D of the melt jet 8 for producing metallic spheres with a diameter d is calculated from the condition that the volume of a cylindrical segment separated due to the vibrationally induced constrictions in the melt jet 8 correspond to the volume of these spheres.

The diameter D of this cylindrical segment corresponds to the diameter of the melt jet 8. The length L of the cylindrical segment corresponds to the vibrationally induced disintegration length L, which in turn corresponds to 4.5 times the value of the diameter D.

In order to produce metallic spheres with a diameter d, the optimal value for the diameter D of the melt jet 8 is thus given by the following equation.

$$D = d/1.89$$

In order to generate such a uniform splitting of the melt jet 8 into sections with a constant disintegration length L, vibrations of constant frequency and amplitude are preferably employed. In this connection the vibrations may be formed transversely and/or longitudinally with respect to the flow direction of the melt jet 8.

The disintegration lengths L are basically predetermined by the interspacings of the vibrational nodes in the melt jet 8. These interspacings are basically given by the following equation $$L = v \times T/2$$

where v denotes the flow velocity of the melt jet 8 and T denotes the periodicity of the vibration.

Due to the vibrationally induced constriction droplets of predetermined size are obtained at the outlet opening of the nozzle 7. The diameter of the droplets depends on the diameter of the nozzle 7, the jet outlet velocity at the nozzle 7, as well as on the vibration parameters, in particular the vibration frequency. These parameters define a process window within which droplets of predetermined and constant size can reproducibly be produced.

When the droplets leave they immediately drop into the coolant 10, whose temperature is below the melting point. Despite the sudden cooling that occurs the droplets do not solidify immediately at the outlet opening of the nozzle 7 but move, still in a liquid state, within the coolant 10, as a result of which a perfect spherical shape of the droplets can form.

The rate of the solidification process of the droplets can be predetermined by the temperature of the coolant 10, in particular the temperature gradient in the longitudinal direction of the column 13. In each case the collecting vessel 11 and in particular the height of the column 13 as well as the temperature of the coolant 10 are dimensioned so that the droplets are solidified before they reach the floor of the collecting vessel 11. In this way undesirable deformations of the spherical metal particles 2 are avoided.

The invention is illustrated in more detail with the aid of the following examples:

EXAMPLE 1

In order to produce spherical metal particles 2 of diameter 0.76 mm from the eutectic alloy SnPb37 the metallic melt 3 is introduced through a nozzle 7 in the form of a ceramic nozzle of diameter 0.4 mm into a vegetable oil (castor oil), which forms the coolant 10. The nozzle outlet is located 1 mm below the surface of the coolant 10, and the maximum temperature of the oil at the surface is 130° C. and decreases from the surface downwards. The nozzle 7 is subjected to a vibration frequency of 500 Hz. The resultant spherical metal particles 2 have a perfect spherical shape and have a metallic shiny surface.

EXAMPLE 2

In order to produce spherical metal particles 2 with diameters of 0.5 mm from the high melting point Pb-based alloy Pb95Sn5 with a melting point range of 305° to 315° C., the melt 3, heated to 360° C., is introduced into a coolant 10 consisting of silicone oil at a temperature of 280° C. The temperature falls to below 200° C. in the first 30 cm of the oil column 13 of the collecting vessel 11. The nozzle 7 consists of a non-rusting stainless steel. The outlet opening has a diameter of 0.29 mm and vibrates at a frequency of 800 Hz. The spherical metal particles 2 produced in this way have a narrow size distribution. 85% of the spheres do not differ by more than ±15 μm from the theoretical diameter of 500 μm.

PROCESS AND DEVICE FOR THE PRODUCTION OF SPHERICAL METAL PARTICLES

Reference Numeral List

1. Device
2. Metal particles
3. Melt
4. Vessel
5. Protective gas atmosphere
6. Melt outflow
7. Nozzle
8. Melt jet
9. Vibrating element
10. Coolant
11. Collecting vessel
12. Basic body
13. Column
14. Discharge device

What is claimed is:

1. A process for the production of spherical metal particles from a melt, wherein in order to produce droplets a melt jet is subjected to vibrations and is led through at least one nozzle, and wherein in order to produce the spherical metal particles the droplets at the outlet of the nozzle are fed to a liquid coolant for purposes of consolidation, and the nozzle dips into the liquid coolant, and the temperature of the coolant is below the melting point of the melt.

2. A process according to claim 1 wherein the temperature of the coolant decreases continuously with increasing distance from the outlet opening of the nozzle.

3. A process according to claim 1 wherein the temperature of the coolant in the region of the outlet opening of the nozzle is at least 10° C., below the melting point of the melt.

4. A process according to claim 3, wherein the temperature of the coolant in the region of the outlet opening of the nozzle is at most 100° C. below the melting point of the melt.

5. A process according to claim 3, wherein the temperature of the coolant in the region of the outlet opening of the nozzle is in a range from 20° to 70° C. below the melting point of the melt.

6. A process according to claim 1, wherein the temperature of the melt jet in the region of the nozzle is at least 10° C. above the melting point.

7. A process according to claim 1, wherein the melting point of the metal particles is below 500° C.

8. A process according to claim 7, wherein the metal particles are formed as soldering beads.

9. A process according to claim 7, wherein the melt has a melting point of at least 300° C., and silicone oils are used as coolant.

10. A process according to claim 7, wherein the melt has a melting point of below 300° C., and mineral oils, synthetic coolants, polyethylene glycols or paraffin oils are used as coolant.

11. A process according to claim 7, wherein the melt has a melting point of below 300° C., and biologically degradable oils are used as coolant.

12. A process according to claim 1, wherein vibrations acting on the melt jet have a constant frequency and a constant amplitude.

* * * * *